United States Patent [19]

Kurr et al.

[11] Patent Number: 5,492,311
[45] Date of Patent: Feb. 20, 1996

[54] ACTIVE POSITIONING ELEMENT

[75] Inventors: Klaus Kurr, Weinheim; Willi Schweikert, Heidelberg; Armin Barth, Gorxheimertal, all of Germany

[73] Assignee: Firma Carl Freudenberg, Weinheim, Germany

[21] Appl. No.: 273,038

[22] Filed: Jul. 8, 1994

[30] Foreign Application Priority Data

Jul. 9, 1993 [DE] Germany ............... 43 22 958.1

[51] Int. Cl.$^6$ ............... F16F 9/10; F16F 13/00; F16F 15/04
[52] U.S. Cl. ............... 267/140.13; 92/151; 267/122; 267/219; 267/24; 267/30; 267/35; 267/140.4; 267/64.14
[58] Field of Search ............... 267/140.11, 140.13, 267/140.14, 140.2, 140.3, 140.4, 122, 219, 220, 217, 227, 226, 225, 24, 30, 31, 35, 34, 152, 153, 64.11, 64.15, 64.19–64.27, 162, 121, 124, 64.14; 92/48, 151; 180/300, 902, 312; 248/562, 636

[56] References Cited

U.S. PATENT DOCUMENTS

| | | | |
|---|---|---|---|
| 2,495,869 | 1/1950 | Schroeder | 92/151 X |
| 2,956,797 | 10/1960 | Polhemus | 267/64.24 |
| 3,037,765 | 6/1962 | Francis | 267/64.24 |
| 3,731,594 | 5/1973 | Rannenberg | 92/97 X |
| 4,401,298 | 8/1983 | Eaton et al. | 267/140.13 |
| 4,518,154 | 5/1985 | Merkle | 267/34 |
| 4,522,220 | 6/1985 | Multrus | 92/97 X |
| 4,560,150 | 12/1985 | Shtarkman | 267/140.13 X |
| 4,590,846 | 5/1986 | Stoll | 92/151 |
| 4,630,808 | 12/1986 | Ushijima et al. | 267/140.13 |
| 4,650,169 | 3/1987 | Eberhard et al. | 267/64.14 |
| 4,709,898 | 12/1987 | Yoshida et al. | 248/636 X |
| 4,756,513 | 7/1988 | Carlson et al. | 248/636 X |
| 4,815,720 | 3/1989 | Vanessi | 267/122 |
| 4,886,251 | 12/1989 | Haussermann | 267/122 |
| 4,984,777 | 1/1991 | Kurr et al. | 267/140.13 |
| 4,997,169 | 3/1991 | Nakamura et al. | 248/562 X |
| 5,016,522 | 5/1991 | Allardin | 92/151 |
| 5,042,786 | 8/1991 | Freudenberg et al. | 267/219 X |
| 5,058,868 | 10/1991 | Sirven | 267/152 X |
| 5,340,094 | 8/1994 | Schyboll et al. | 267/140.13 X |
| 5,344,127 | 9/1994 | Hettler et al. | 267/219 |

FOREIGN PATENT DOCUMENTS

| | | |
|---|---|---|
| 3918753 | 7/1990 | Germany . |
| 0020134 | 1/1991 | Japan ............... 180/312 |

Primary Examiner—Douglas C. Butler
Attorney, Agent, or Firm—Kenyon & Kenyon

[57] ABSTRACT

An active positioning element for a rubber mount, including a space surrounded by a housing, a positioning member and a working member which is designed as a spring element arranged within the space. The positioning member and the working member are movable back and forth in the direction of oscillations introduced into the rubber mount, and the positioning member is sealed in the housing. The positioning member is formed by a gas pressure spring which can be acted on by gas under pressure, the gas pressure spring comprising at least one piston-cylinder unit which has a roller membrane for sealing the piston off from the housing. The spring element is formed by a compression spring which, in the direction of the oscillations introduced, rests under elastic initial stress, on one side against the positioning member and on another side against the support bearing of the rubber mount.

11 Claims, 3 Drawing Sheets

ACTIVE POSITIONING ELEMENT

BACKGROUND OF THE INVENTION

1. Field of the Invention

The present invention relates to an active positioning element for a rubber mount. The element includes a space surrounded by a housing, a positioning member, and a working member which is designed as a spring element arranged within the housing. The positioning member and the working member are movable back and forth in the direction of oscillations introduced into the rubber mount, and the positioning member is sealed off from the housing.

2. Description of the Related Art

A positioning element is shown in German Patent 39 18 753. In that patent, the positioning element is integrated in a hydraulically dampening rubber mount, the positioning element is formed by an electromagnet and the working member is formed by a leaf spring on which the electromagnet rests. The positioning element in this prior art embodiment is used for active isolation of acoustically disturbing oscillations. The manufacture and use of the positioning element of this type can be difficult, since the introduction of fluid into the space and the sealing of the space require a particularly expensive design, and since the physical properties of the fluid available generally require attention to electrical insulation of the current-conducting parts of the positioning member, as well as arrangement of the positioning element in a thermally insulated fashion.

SUMMARY OF THE INVENTION

The object of the present invention is to provide a positioning element in which the spring element which forms a part of the positioning element can, if necessary, be connected in series with the support spring of the rubber mount, and in which the positioning element can be manufactured more simply and at less cost and can be used as separate part in existing rubber mounts.

In the present invention, the positioning member may be formed by a gas pressure spring which can be acted on by gas under pressure. The gas pressure spring can use at least one piston-cylinder unit which has a roller membrane for sealing the piston off from the housing. The spring element can be formed by a compression spring which rests in the direction of the oscillations introduced, with elastic deformation, at one end on the positioning member and at the other end on the support bearing of the rubber mount. Due to the fact that the positioning element can be manufactured as a separate part, independently of the rubber mount used, all rubber mounts which are known can be made switchable onto the positioning element of the present invention by a simple flange attachment. The spring element which forms a part of the positioning element and is switchable during the intended use, in series with the support spring of the rubber mount, allows simple adaptation of the overall spring characteristic of the rubber mount to the oscillations to be isolated and/or dampened. The support spring of the rubber mount and the spring element of the positioning element can have similar or different spring characteristics. If the spring element is connected to the support spring by actuation of the positioning element, a relatively soft spring characteristic is established for the isolation of low-frequency oscillations of great amplitude. If the spring element, on the other hand, is mechanically disconnected from the support spring of the rubber mount, the rubber mount has its original properties of use.

The rubber mount may be an active or a passive mount. However, the rubber mount is preferably a passive mount which is designed as a hydromount and can be switched with respect to spring rate by the positioning element.

The use of a gas pressure spring which can be acted on by gas under pressure is advantageous due to its soft switchability and its inexpensive manufacture. For isolating acoustically disturbing oscillations, a comparatively low spring rate of the mount is desired. In order to obtain greater elastic resilience of the rubber mount, the gas pressure spring is acted on by pressure, in which connection the piston-cylinder unit moves axially in the direction of the adjoining rubber mount until the spring element within the positioning element is connected in series with the support spring of the rubber mount. In the non-switched condition, the spring element within the positioning element is inactive and the elastic resilience of the rubber mount is determined exclusively by the resilience of the support spring.

If only one piston-cylinder unit is used, it is to be noted that, due to the comparatively small size of the pneumatically active piston surface, a comparatively large difference in pressure on the two sides of the piston is necessary for actuating of the positioning element.

If the pressure which can be fed into the gas pressure spring is limited, so that only a comparatively slight difference in pressure on the two sides of the piston results which would not be sufficient to actuate the positioning element if one piston-cylinder were used, several piston-cylinder units can be combined in parallel. If, for instance, the positioning element is used in combination with a motor mount, the gas pressure spring can be acted on by the vacuum in the intake pipe. For the resilient mounting of parts of heavy weight such as internal combustion engines or machine tools, it has proven advantageous for several piston-cylinder units to be combined in parallel. It is advantageous that, other limiting conditions being the same—such as the pneumatically active surface of the individual piston and the gas pressure which can be applied to the second spring element—the force which can be transmitted can be adapted to the load to be supported. The force which can be transmitted by the gas pressure spring to the rubber mount is determined by the number of piston-cylinder units connected in parallel so that, upon actuation of the gas pressure spring, the spring element is connected in series with the rubber mount and in that way the overall spring characteristic of the mount becomes relatively soft. For isolating oscillations which occur for instance in the region of the idling speed of internal combustion engines, this is the case. The reaction of pressure on the gas pressure spring therefore takes place only for a relatively short time while the spring element is mechanically disconnected from the rubber mount outside the speed range of the internal combustion engine which is close to idling, and a relatively harder spring characteristic for the damping of higher frequency oscillations thereby results. Regardless of the dimensions of the piston rod, to which all pistons are connected jointly and relatively fixed in position, the force which can be transmitted for the actuating of the spring element is substantially proportional to the number of pistons used. By this development it is possible to adapt the transmittable force to the prevailing circumstances of the case of use by a simple structural change in the positioning element. By a modular construction, the possibilities of use in combination with already existing spring and/or damping systems are made possible.

For isolating low-frequency oscillations there can be provided, in front of a passive rubber mount, a positioning element arranged in series thereto having a spring element so that the frequencies to be isolated are changeable and are not transmitted to the adjoining parts.

Sealing off the piston-cylinder unit by a roller membrane is advantageous since the membrane is particularly easily deformable upon movements of the piston in the direction of the oscillations introduced. As a result, the response behavior of the gas pressure spring is improved. Furthermore, such sealing has the advantage over sealings which are subject to friction that wear, which may reduce the useful life of the seal and thus impair the properties of use. This design results in dependable sealing off of the individual spaces of the gas pressure spring acted on by pressure from the regions of the piston-cylinder unit acted on by atmospheric pressure.

The pistons can be acted on, on one side, by a pressure which is less than atmospheric pressure and, on the other side, by atmospheric pressure. If the gas pressure spring is acted on by vacuum, there is the advantage that the rubber mount provided with the positioning element can be used without problem to support an internal combustion engine in a motor vehicle.

In accordance with another development, it can be provided that the piston is acted on, on one side, by atmospheric pressure and, on the other side, by a pressure which exceeds atmospheric pressure. Such actuation is advantageous when a pressure sufficiently large for actuating the gas pressure spring is available from an adjoining unit, for instance a compressor.

In accordance with one advantageous embodiment, the spring element can be formed by a compression spring of a metallic material. It is advantageous that the compression spring have corresponding properties of use during the entire useful life of the positioning element and that relaxation phenomena are avoided.

In accordance with an advantageous embodiment, the compression spring can be formed by a pack of Belleville springs. The use of Belleville springs is of particular advantage when the positioning element is used in combination with motor mounts. The S-shaped spring characteristics of Belleville springs allows the springs to be operated upon actuation by the gas pressure spring within a region in which changes in the spring path of the pack of Belleville springs result in substantially no change in the spring force. Within this region, the Belleville springs have particularly large resilience so that, in combination with the support spring of the rubber mount which is connected in series, a particularly large resilience can be obtained for isolating acoustically disturbing oscillations. The use of a pack of Belleville springs is furthermore advantageous with respect to producing a positioning element with small axial dimensions.

The housing can be provided, on the side facing the rubber mount, with a conically widening support surface, the support surface being rubberized and being adapted to be brought into engagement with a congruently shaped support bearing of the rubber mount, when the positioning member not acted on by a pressure difference. In this connection, it is advantageous that the rubber mount, in the condition when the positioning element not acted on by a pressure difference, be supported upon the introduction of transverse forces by the support surfaces. By rubberizing the support surfaces, noise-free switchability of the mount is produced.

BRIEF DESCRIPTION OF THE DRAWINGS

The positioning element of the invention will be further explained below with reference to the accompanying drawings, in which.

DETAILED DESCRIPTION OF THE DRAWINGS

Figure 1:
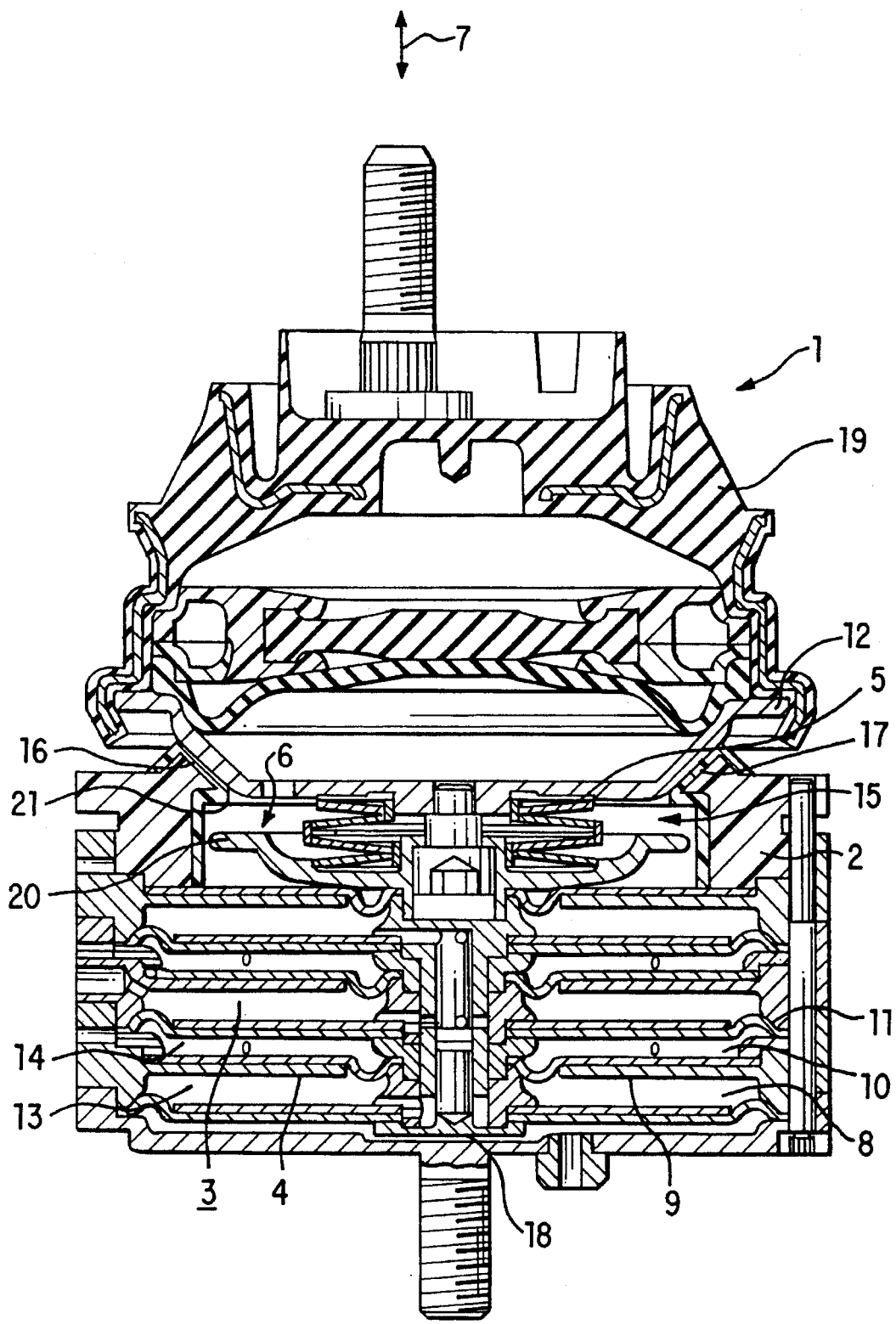
FIG. 1 shows an embodiment of the positioning element of the present invention in combination with a hydraulically dampening mount, the positioning element being shown in the condition where it is not acted on by a pressure difference.

FIG. 1 shows an embodiment of the positioning element of the present invention in combination with a rubber mount 1. The rubber mount 1 in this embodiment is hydraulically dampening. The rubber mount 1 is not the object of the present invention, is known in the art, and will therefore not be described in further detail. The positioning element is provided with a non-resilient housing 2 which is open in a direction towards the adjoining rubber mount 1; the housing 2 also surrounds a space 3. Within the space 3 there is arranged the positioning member 4 developed as gas pressure spring 8 and a working member 6 developed as spring element 5. The positioning member 4, the working member 6 and the housing 2 are arranged concentrically to each other. In the embodiment of FIG. 1, the gas pressure spring 8 comprises four piston-cylinder units 9, 10, each of which is sealed off by a roller membrane 11 from housing 2. The pistons 9, on side 13, can be acted on by a pressure less than atmospheric pressure and, on the other side 14, by atmospheric pressure. The action of atmospheric pressure takes place through recesses within the housing 2 which pass through the housing wall radially, in the direction towards the corresponding cylinder 10. The vacuum may be obtained from the intake pipe of an internal combustion engine. The vacuum on side 13 is effected by the piston rod, which is of hollow cylindrical shape and has recesses in the direction of the space which can be acted on by pressure. The pistons 9, each of which is arranged in a cylinder 10, divide the corresponding cylinders 10 into two axially adjacent partial spaces. The pistons 9 are fastened to a common piston rod 18. The pistons 9 are moved, as a function of the pressure difference applied, in the direction towards the partial space 13 or 14 which is acted on by the comparatively lower pressure. The parallel connection of the piston-cylinder units 9, 10 produces a comparatively large resultant piston surface, in which the total force obtained is formed by addition of the individual forces of the corresponding piston-cylinder units 9, 10. The total force is approximately four times as great as each individual force. The parallel connection of the piston-cylinder units 9, 10 is particularly useful when the vacuum with which the gas pressure spring is acted on is limited. This can be the case, for instance, when the positioning element is used in combination with a rubber mount 1 designed as motor mount and the pressure action is by vacuum from the intake pipe of the internal combustion engine. Despite the relatively small difference in pressure axially on the two sides of the piston 9, this design allows lifting of the rubber mount 1 from the support surface 16 of the housing 2, and allows switching the spring element 5, which is developed as pack of Belleville springs 15, in series with the support spring 19 of the rubber mount 1. By the series connection of the spring element 5 with the support spring 19, an overall comparatively soft spring characteristic is obtained in order to be able to isolate acoustically disturbing oscillations.

Figure 2:
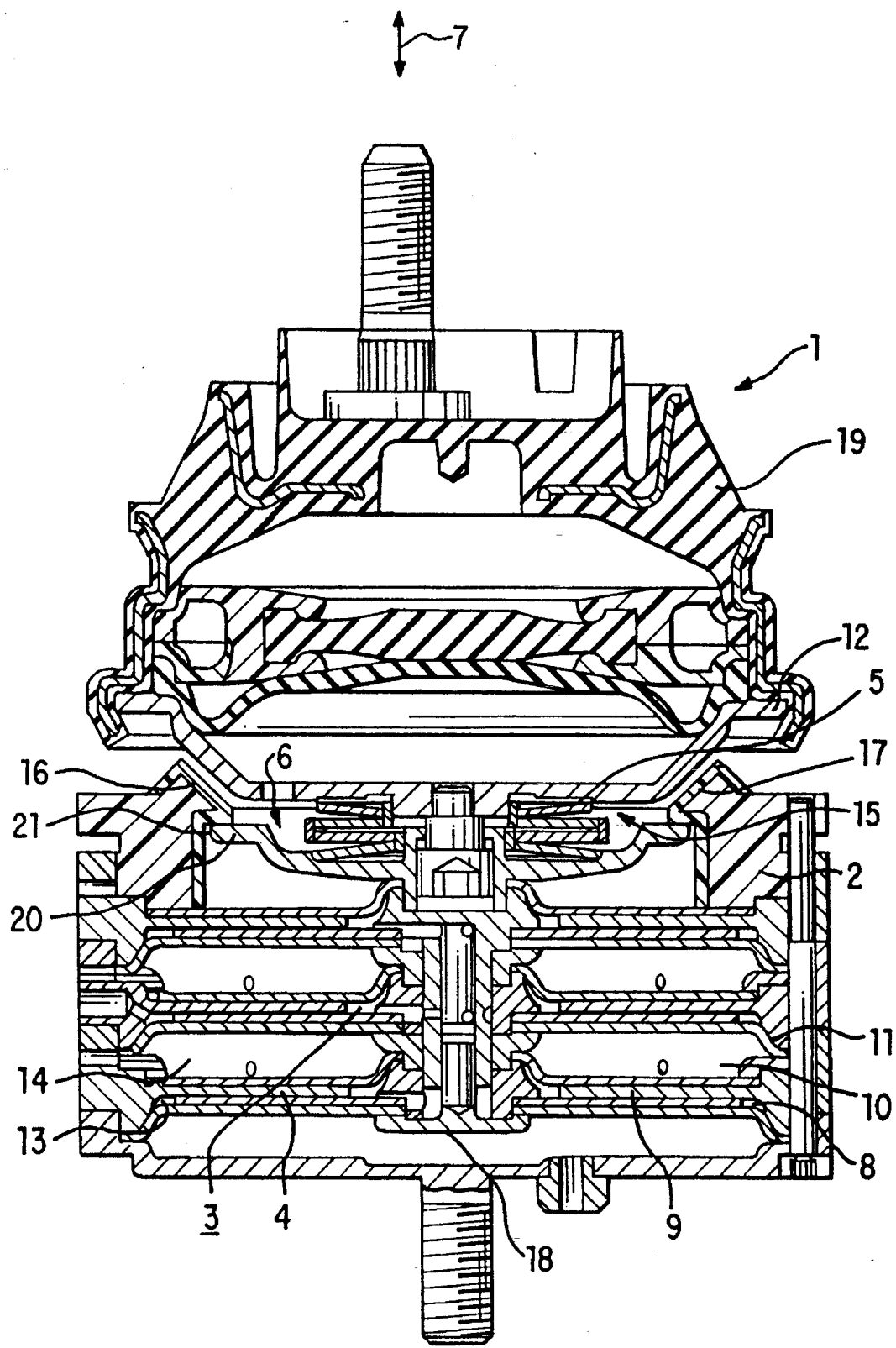
FIG. 2 shows the positioning element of FIG. 1 in the condition where it is acted on by a vacuum, the spring element of the positioning element and the support spring of the rubber mount being connected in series.

FIG. 2 shows the positioning element in the condition when acted on by a vacuum. If the internal combustion engine is operated outside the speed range in which acoustically disturbing oscillations can occur, the pressure action of the gas pressure spring 8 is withdrawn and the rubber mount 1 seats itself with its support bearing 12 on the rubberizing 17 of the support surface 16. For the elastic resilience of the rubber mount 1, in such case only the support spring 19 is substantially still relevant. The actuating of the positioning element and thus the connecting of the spring element 5 is effected as a function of parameters which describe the oscillations to be isolated or dampened. The vacuum action in these examples can be controlled, for instance, by the electronic motor control. A parameter which describes the oscillations which occur is formed, for instance, by the speed of rotation of the motor.

The positioning element in the embodiment shown in the drawing figures furthermore comprises a stop 20 which is arranged in the axial direction between the gas pressure spring 8 and the Belleville-spring pack 15. The stop is movable in the axial direction jointly with the piston 9 of the gas pressure spring, the path in the axial direction being dependent on the force transmitted by the piston-cylinder units 9, 10. As shown in FIG. 2, there is the possibility of acting with vacuum on the piston-cylinder units 9, 10 so that the stop 20 is brought into engagement with opposing stop surfaces 21 of the housing 2. In order to avoid switch noises, the rubberizing 27 also covers the mating stop surfaces 21 in the direction of the stop 20. In this case, the support spring 19 of the rubber mount 1 and the Belleville-spring pack 15 of the positioning element are connected operatively in series as described above.

The gas pressure spring 18 is provided only in order to lift the support bearing 12 of the rubber mount I from the support surface 16 of the positioning element. The gas pressure spring 8 can in this example be considered substantially non-resilient so that only the support spring 1 and the Belleville-spring pack 15 are connected in series in the position shown in FIG. 2.

Figure 3:
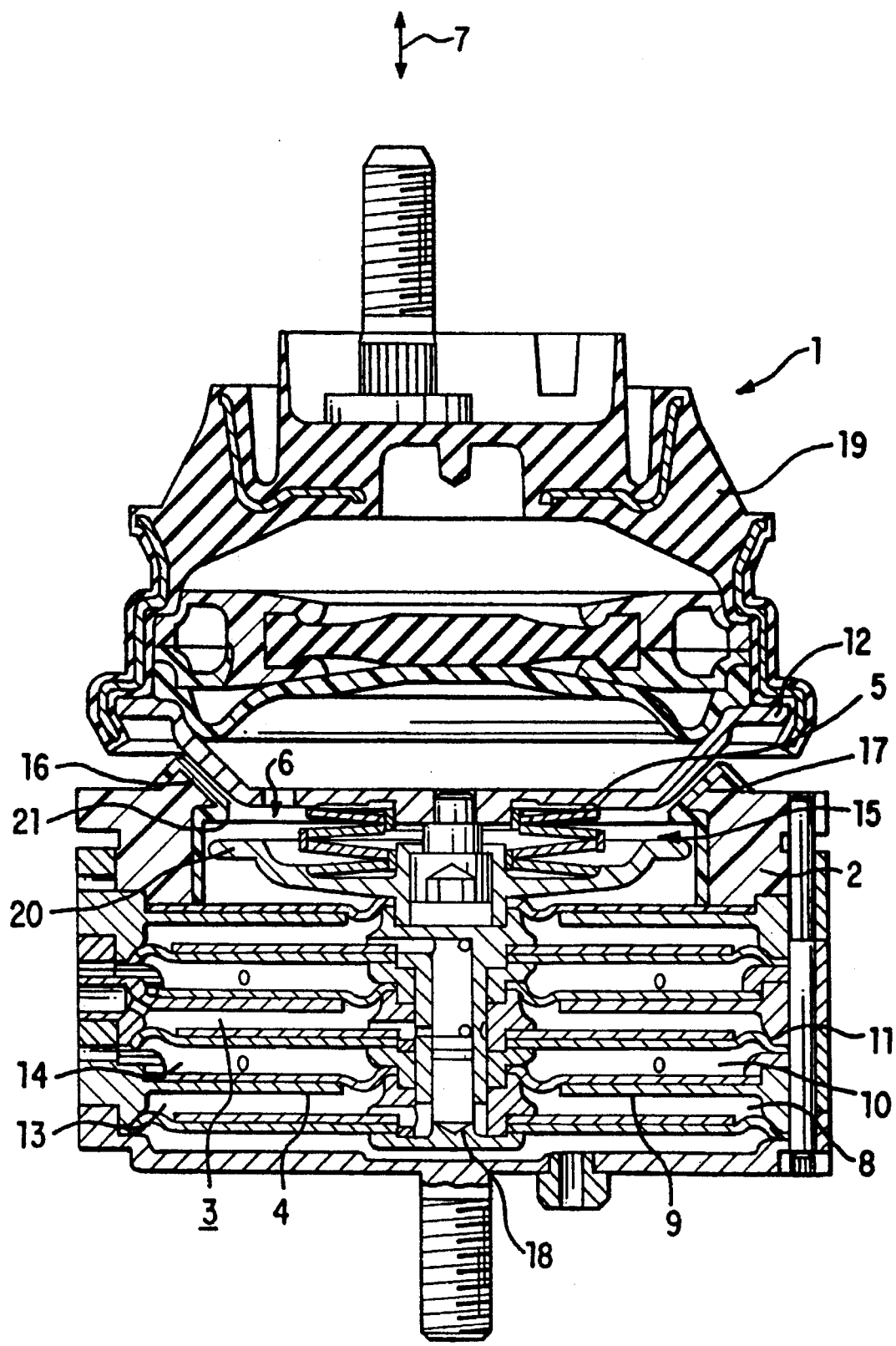
FIG. 3 shows the positioning element in an operating condition different from FIGS. 1 and 2.

As opposed from the actuation described in FIG. 2, the positioning element described above is shown in FIG. 3 wherein the action of vacuum on the piston 9 is such that the stop 20 is held suspended between the positions shown in FIGS. 1 and 2. In this way, the gas pressure spring 8 is connected in series with the support spring 19 of the rubber mount 1 in addition to the series-connected spring pack 15, in order to obtain a further reduction in the overall stiffness of the spring.

We claim:

1. An active positioning element for a hydraulically-damped mount, said mount comprising an elastomeric spring and a support bearing, said active positioning element comprising:

a housing, said housing surrounding a space;

a working member, said working member being located within said space, said working member comprising a spring element, said spring element comprising a compression spring, said working member being movable within said space; and a positioning member, said positioning member being located within said space, one side of said compression spring contacting said positioning member and another side of said compression spring contacting said support bearing, said positioning member comprising a plurality of pistons, said positioning member further comprising a plurality of rolling diaphragms sealing said pistons to said housing, each of said pistons being acted on by a fluid pressure difference to move said pistons and said compression spring, said pistons arranged in parallel with the parallel connection of the pistons producing a comparatively large resultant piston surface in which the total force obtained is formed by the addition of the individual forces of the corresponding pistons.

2. The active positioning element of claim 1, wherein:

said pistons are acted upon by a pressure less than atmospheric pressure on one side and by atmospheric pressure on another side.

3. The active positioning element of claim 1, wherein:

said pistons are acted on by atmospheric pressure on one side and by a pressure greater than atmospheric pressure on another side.

4. The active positioning element of claim 1, wherein:

said compression spring comprises a metallic material.

5. The active positioning element of claim 1, wherein:

said compression spring comprises a plurality of Belleville springs.

6. The active positioning element of claim 1, wherein:

said housing, on a side facing said support bearing, comprises a conically widened support surface, said support surface being covered with an elastomeric material, and wherein said support surface engages said support bearing when said positioning member is not acted on by said pressure difference.

7. A hydraulically-damped mount comprising:

an elastomeric spring;

a support bearing connected to said elastomeric spring;

a housing, said housing surrounding a space;

a working member, said working member comprising a compression spring, said working member being movable within said space; and a positioning member, said positioning member being located within said space, one side of said compression spring contacting said positioning member and another side of said compression spring contacting said support bearing, said positioning member comprising at least one piston, said positioning member further comprising at least one rolling diaphragm sealing said at least one piston to said housing, said at least one piston being acted on by a fluid pressure difference to move said support bearing relative to said housing a plurality of pistons arranged in parallel with the parallel connection of the pistons producing a comparative large resultant piston surface in which the total force obtained is formed by the addition of the individual forces of the corresponding pistons.

8. The hydraulically-damped mount of claim 7, wherein:

said at least one piston is acted upon by a pressure less than atmospheric pressure on one side and by atmospheric pressure on another side.

9. The hydraulically-damped mount of claim 7, wherein:
said at least one piston is acted on by atmospheric pressure on one side and by a pressure greater than atmospheric pressure on another side.

10. The hydraulically-damped mount of claim 7, wherein:
said compression spring comprises a plurality of Belleville springs.

11. The hydraulically-damped mount of claim 7, wherein: said housing, on a side facing said support bearing, comprises a conically widened support surface, said support surface being covered with an elastomeric material, and wherein said support surface engages said support bearing when said positioning member is not acted on by said pressure difference.

* * * * *